United States Patent [19]

Hong et al.

[11] Patent Number: 5,281,360
[45] Date of Patent: Jan. 25, 1994

[54] BARRIER COMPOSITION AND ARTICLES MADE THEREFROM

[75] Inventors: Kuo-Zong Hong, Barrington, Ill.; Yong J. Kim, Neenah, Wis.; Stephen W. Cornell, Wheaton, Ill.

[73] Assignee: American National Can Company, Chicago, Ill.

[21] Appl. No.: 472,400

[22] Filed: Jan. 31, 1990

[51] Int. Cl.$^5$ .................. C09K 15/00; C08K 5/00
[52] U.S. Cl. .................. 252/188.28; 428/358; 428/483; 525/371
[58] Field of Search .................. 252/188.28, 188.1

[56] References Cited

U.S. PATENT DOCUMENTS

| | | | |
|---|---|---|---|
| 4,501,781 | 2/1985 | Kushida et al. | 428/39 X |
| 4,535,901 | 8/1985 | Okudaira et al. | 215/1 X |
| 4,908,272 | 3/1990 | Harada et al. | 428/412 X |
| 5,021,515 | 6/1991 | Cochran et al. | 525/371 X |
| 5,034,252 | 7/1991 | Nilsson et al. | 428/35.8 X |
| 5,049,624 | 9/1991 | Adams et al. | 525/371 X |

FOREIGN PATENT DOCUMENTS

| | | |
|---|---|---|
| 0105825 | 4/1984 | European Pat. Off. . |
| WO8901012 | 2/1989 | PCT Int'l Appl. . |
| 2207439A | 2/1989 | United Kingdom . |

Primary Examiner—Richard D. Lovering
Assistant Examiner—Joseph D. Anthony
Attorney, Agent, or Firm—Mary J. Schnurr

[57] ABSTRACT

Blends of polymers, such as aromatic condensation polymers including formable polyesters and polycarbonates with an oxygen barrier material such as aromatic or aliphatic nylon, an amorphous nylon or EVOH, which have been oriented and which contain a transition metal catalyst, exhibit the improved barrier properties and oxygen absorption properties of the present invention.

24 Claims, 3 Drawing Sheets

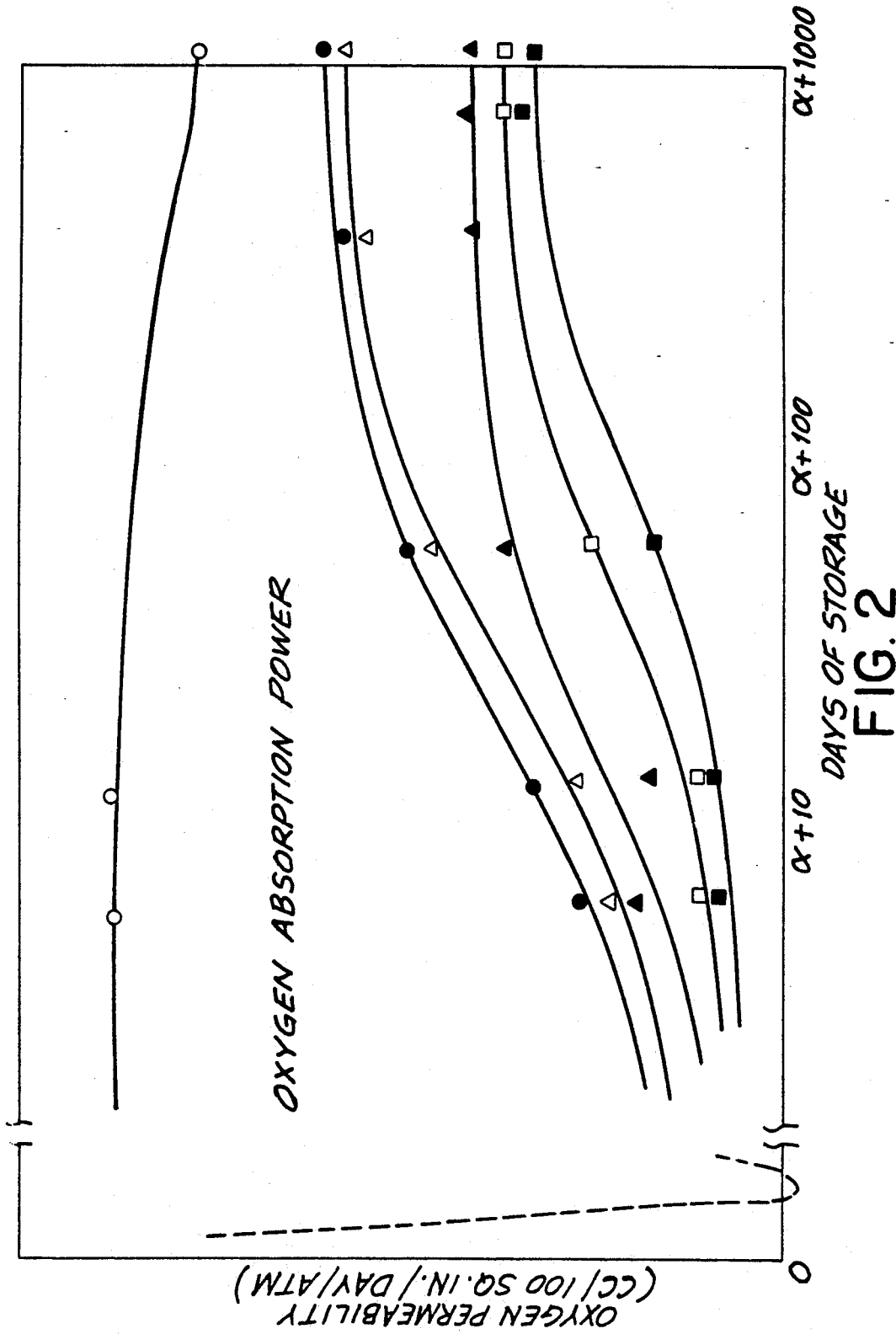

BARRIER COMPOSITION AND ARTICLES MADE THEREFROM

BACKGROUND OF THE INVENTION

Many products, particularly food products are sensitive to the presence of oxygen and/or the loss or absorption of water. These products are susceptible to deterioration when packaged due to oxygen and/or moisture absorption or loss through the wall of the package. Attempts to solve the problem have led to the widespread use of oxygen barriers and/or moisture barriers in packaging materials. Typical moisture barriers include polyethylene and polypropylene. Suitable oxygen barriers include EVOH PVOH, Nylon and blends thereof. Vinylidene chloride—vinyl chloride copolymers and vinylidene chloride—methyl acrylate copolymers are suitable as both moisture and oxygen barrier.

A problem with conventional barrier materials is that due to their high cost or their unstable structural characteristics or other weaknesses, it is difficult to fabricate commercial packaging solely out of barrier materials. For instance, EVOH, while having superior oxygen barrier properties, suffers from moisture problems because of the many hydroxyl groups in the polymer. Other barrier materials are so expensive that to manufacture structures solely from those barriers would be cost prohibitive. Accordingly, it has become a common practice to use multilayer structures whereby the amount of expensive or sensitive barrier material may be reduced to a thin layer and inexpensive polymer can be used on one or both sides of the barrier layer as structural layers. In addition, the use of multilayer structures permits the barrier layer to be protected from attack by stronger structural layers on one or both sides of the barrier layer.

Although multilayer structures containing a barrier layer may be cheaper and stronger than a single layer of barrier material, such structures are more complicated to manufacture than single-layered ones. In addition, multilayer structures being comprised of layers of a variety of different materials may be opposed in some instances on environmental grounds because they may be more difficult to recycle since it is frequently difficult to separate the layers, except at great expense. In addition, reducing the thickness of the barrier layer in a multilayer structure in many instances reduces the barrier properties of that film. Accordingly there is a need for a single-layer packaging material with barrier properties but without the cost, or structural weaknesses of packaging made solely from a barrier material. There is also a need for additional multilayer structures having improved barrier properties where the amount of barrier material may be reduced to a thinner layer than otherwise used and replaced in part by inexpensive structural layers to provide structures that give the same barrier properties of prior art barriers but at lower cost due to a decrease in the amount of expensive barrier material needed.

In addition to barrier properties it is frequently desirable to use materials which have oxygen absorption capabilities. These oxygen absorption or oxygen scavenging materials are useful in reducing the amount of oxygen that contaminate the product packaged in the container. An example of oxygen scavenging materials and methods of using them is disclosed in U.S. Pat. No. 4,425,410 to Farrell et al, the disclosure of which is hereby incorporated by reference herein. Another useful aspect of oxygen absorbing material is that such materials can reduce residual oxygen which is trapped in the headspace of a container during sealing thereby preventing it from having a deleterious effect on the packaged products.

A material that is commonly used in packaging applications is polyethylene terephthalate resin, hereinafter referred to as PET. While PET has a number of valuable properties in packaging, it does not have as good a gas barrier property as is frequently required or desired in many applications. For example, although PET has good oxygen barrier properties for soft drinks, it has not been found useful in packaging such products as beer because beer rapidly loses its flavor due to oxygen migration into the bottle or for such products such as citrus products, tomato based products and aseptically packed meat. A packaging material with physical properties similar to PET is polyethylene naphthalate (PEN), but the latter has a 3–20 times improvement in barrier property and is considerably more expensive.

In order to enhance polyester's gas barrier properties, polyesters have been used in a multilayer structure in combination with a layer having excellent gas barrier properties such as EVOH. One difficulty that has been encountered in multilayer structures employing polyester such as PET is that there are frequently adhesion problems of the polyester to the barrier layer thus leading to possible delamination over time.

One approach to enhancing the gas barrier property of PET is to use a resin mixture which includes PET and a xylylene group containing polyamide resin. Such resin materials are disclosed e.g. in U.S. Pat. No. 4,501,781 to Kushida et al. One of the considerations encountered with such blends according to Kushida is that there is a limit to the amount of xylylene group-containing polyamide resin that may be present in the PET blend. Kushida indicates that amounts of xylylene group-containing polyamide resin greater than 30% by weight with PET causes the container to become a laminated foil structure thereby possibly causing exfoliation between the foil layers of the container.

According to Kushida, the permeation of oxygen gas in a container made with PET and a xylylene group-containing polyamide decreases when compared with the permeation of oxygen gas through a container made solely of PET. Kushida reports that a bottle shaped container made with PET-xylylene group-containing polyamide had 0.0001 cc of oxygen permeation per day compared to 0.0180 cc of oxygen permeation per day for a container molded with PET.

While this patent reports improved barrier properties using PET nylon MXD6 blends for oxygen there is a further need for oxygen barriers of greater resistance to permeation. In addition, there is a need for compositions which exhibit oxygen absorbing properties in addition to acting as a good oxygen barrier material. Thus it is an object of the present invention to provide an improved monolayer barrier structure that satisfies both barrier and absorption functions.

It is also an object of the present invention to provide a monolayer barrier structure of the present invention that has superior barrier properties than known barrier materials.

It is a further object of the present invention to provide a multilayer structure having a PET layer with improved oxygen scavenging ability.

BRIEF DESCRIPTION OF THE DRAWING

FIG. 2 is a graph showing the oxygen absorption of the blends of the present invention over time.

DETAILED DESCRIPTION OF THE INVENTION

Figure 1A:
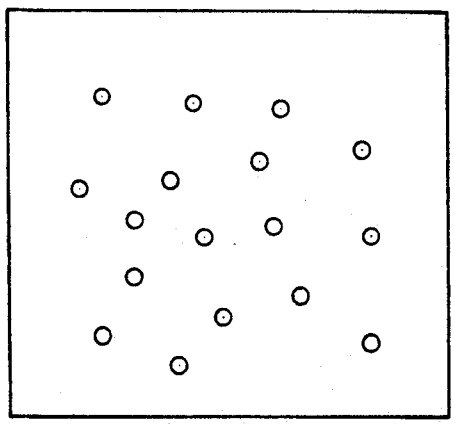
FIG. 1A is a representation of a mixture of oxygen barrier material in a polyester.

It has been discovered that compositions having superior oxygen barrier properties in conjunction with oxygen absorption properties are achieved according to the present invention by biaxially orienting structures in the form of containers, films, sheets, pouches or lidstock having an oxygen barrier material and a transition metal catalyst present in the composition.

In addition, the structures of the present invention may be in the form of a single layer in a multilayer film such as a multilayered film which has been coextruded or laminated. The composition of the present invention may also be in the form of a chip which can be used as an oxygen scavenger in a container either as a single layer or a multilayer structure. When the composition is to be used as a chip it should be stored in a nitrogen environment.

Specifically blends of polymers such as aromatic condensation polymers including formable polyesters and polycarbonates with an oxygen barrier material such as aromatic or aliphatic nylon, an amorphous nylon or EVOH which have been oriented and which contain a transition metal catalyst exhibit the improved barrier properties and oxygen absorption properties of the present invention. For example, PET blends with xylylene group-containing polyamide resin have superior oxygen barrier and oxygen absorption properties under certain conditions when a transition metal catalyst is present in the blend and the material has been biaxially oriented. PET-xylylene group polyamide compositions containing a transition metal catalyst which have been biaxially oriented, show marked oxygen absorption characteristics, i.e., act as an oxygen scavenger and have significant oxygen barrier properties not disclosed by the prior art blends of PET and nylon. By the term catalyst it is meant that the transition metal is a synergyst or promoter of a reaction, but is not necessarily present as a constituent in the final reaction product.

The improved barrier properties of the compositions of the present invention are unaffected by normal fluctuation of temperature and humidity.

The composition of the present invention comprises a blend of polyester such as PET and up to about 30% of a barrier material such as a xylylene group-containing polyamide with about 49 ppm to about 110 ppm catalyst most preferably in the form of a nascent catalyst residue from the PET. The barrier material is preferably a xylylene group-containing polyamide resin commonly known as nylon MXD6 which is available from Toyobo or Mitsubishi Gas Chemicals Company. The PET is available from Eastman or Hoechst Celanese or ICI America. The catalyst is a transition metal. Cobalt has been found to be particularly useful in the present invention. Transition metal catalysts are defined as catalysts of metals which have filled or partially filled outer d orbitals or are those having filled d orbitals and filled or partially filled p orbitals.

Multi-layer structures having a barrier layer of nylon MXD6 and two outer layers of PET wherein the nylon MXD6 comprises about 10 wt. % of the total structure will provide a clear film or container. However, the oxygen barrier properties of such multilayer structures are not as good as blends of the present invention. In addition, such multilayer structures will not provide the oxygen absorption capabilities of the present invention.

In blending the polyester with the oxygen barrier material—it is preferable that a physical blend of the pellets be made in a suitable mixing device. The process disperses the particles of the barrier material in the polyester. In one embodiment of the present invention PET and nylon MXD6 are mixed together in a screw extruder to form a blend. This extrusion is formed into a preform and then oriented to form a structure such as a container or bottle. When barrier material is blended with polyester the barrier material is normally present as spherical particles dispersed in PET.

The container made in accordance with this method, is not as clear as the prior art structure described above. However, the container does exhibit superior oxygen barrier and oxygen absorption characteristics not present in the prior art structure. In a second embodiment the blend of PET and up to about 30 wt. % nylon MXD6, preferably 10 wt. % nylon MXD6, is coextruded as a barrier layer with a layer of PET on each surface thereof to form a three layer structure. In a preferred embodiment for example, the barrier layer would be a blend of 10 wt. % nylon MXD6 and the overall percentage of nylon MXD6 in the structure would be about 2 wt. %. Containers made from this structure are generally as clear as the prior art container having a barrier layer of nylon MXD6 but considerably less nylon MXD6 is needed to give a comparable amount of impermeability to oxygen. In addition in the blends of the present invention the presence of the catalyst and the orientation increases the barrier properties of these structures and also provide oxygen absorption capabilities.

Figure 1B:
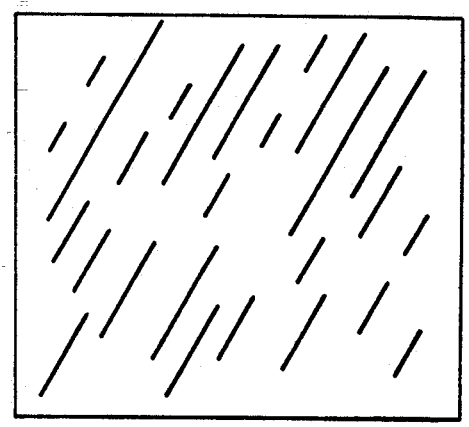
FIG. 1B is a representation of a mixture of oxygen barrier material in a polyester after the material has been biaxially oriented.

Although the mechanism of the present invention is not completely understood it is believed that the high orientation of the blend increases the surface areas and interface between PET and nylon MXD6 so that there are a greater number of sites at which a reaction or an absorption of oxygen catalyzed by the transition metal catalyst takes place. FIG. 1A depicts an unoriented blend of polyester and barrier material wherein the barrier material constitutes distinct spherules in the polyester. If this blend is subject to orientation the spherules of barrier materials become elongated biaxially thereby increasing their surface area substantially. The biaxially oriented particles produce a layered structure composed of many discontinuous, overlapping barrier platelets of barrier material within the polyester matrix. This is shown in FIG. 1B. It is believed that the increased surface area provides a greater number of sites for oxygen to be absorbed and/or reacted by the material when the reaction is catalyzed by the transition metal catalyst. In addition, it is believed that the oxygen barrier increases because the increased surface area of the barrier material increases the likelihood that the oxygen molecule while traversing the polyester material will encounter barrier material.

The orientation step of the present invention permits increased oxygen barrier and oxygen absorption without unduly requiring an increased amount of transition metal catalyst in the blend. Thus, an unoriented blend of polyester and barrier material needs higher amounts of catalyst in the blend to yield the same oxygen barrier and oxygen absorption properties of the present invention. Such levels may have a deleterious effect on color and other properties of the structure. Oriented blends of the present invention can form a pearlescent structure if desired. Pearlescence occurs when there is a high degree of orientation as discussed below or orientation occurs at a low temperature.

Although the detailed absorption/reaction mechanism is not fully understood concentrations of about 49 ppm to about 110 ppm residual catalyst in a polyester-barrier material blend such as a PET-xylyene group-containing polyamide resin blend have not only superior oxygen barrier properties but also significant oxygen scavenging capabilities.

Thus, in the present invention there is provided a composition having superior oxygen barrier and oxygen absorption characteristics. This composition may be employed as a mono or multilayer biaxially oriented film, such as, for example, in a pouch or flexible lidstock. These compositions may also be formed into rigid containers. These compositions may comprise the sidewall, body or lid or maybe the entire container. Also, the composition of the present invention may be formed into a chip and used in a container as an oxygen scavenger.

A preferred embodiment of the present invention is a blend of PET and nylon MXD6 present in an amount of about 2.5 weight % to about 15 weight % with the balance being PET. Cobalt is present in a range of 49 ppm to about 110 ppm with 62 ppm being most preferable.

In a more preferred embodiment the nylon MXD6 is present in an amount about 4 weight % to about 10 weight % with the balance being PET. Cobalt is preferably present in the range of 49 ppm to about 110 ppm and most preferably present in an amount of about 62 ppm.

In the most preferred embodiment, nylon MXD6 is present in the blend in an amount of about 7.5 % with the remainder being PET and cobalt present in the amounts stated above.

Nascent cobalt is present as part of the PET polymerization catalyst system. Specially added cobalt is preferably present as a cobalt salt dispersed in mineral spirits such as that sold under the trademark Nuodex by Huls America. The Nuodex products contain up to about 15% by weight cobalt. The preferred maximum amount of catalyst is about 250 ppm.

The xylyene group containing polyamide is preferably a nylon MXD6 which is produced by condensation polymerization of meta-xylylene diamine (MXDA) and adipic acid. The polyamide may preferably be nylon, nylon 6 or nylon 6.6 or copolymers thereof.

Significant increases in oxygen barrier and oxygen absorption ability of structures made from the blend of the composition of the present invention are achieved when the said structure has been biaxially oriented. In biaxially orienting the blend of the present invention it is preferred that the preform made from the blend be oriented such that the ratio of the radius of the oriented structure to the radius of the preform is between about 3–6:1 and preferably 3.5–5:1. The ratio of the length of the oriented structure to the length of the preform should be in the range of 1.5–2.5:1 although higher ratios may be possible. For instance, the ratio could in some instances be about 1–4:1 in the longitudinal direction and about 2–7:1 in the crosswise direction.

The areal ratio of the oriented structure to the preformed structure is in the range of 5–12:1 and preferably 7–10:1. The areal ratio is determined by the following formula:

$$AR = \frac{R_1 L_1}{R_o L_o}$$

where $R_1$ is the radius of the oriented structure and $L_1$ is the length of the structure and $R_o$ is the radius of the preform and $L_o$ is the length of the preform. It has been found that the higher the areal ratio the better the orientation and accordingly the better the oxygen absorption.

Where the product made is a film or sheet the total areal ratio should be determined by the following formula:

$$AR = \frac{L_1 W_1}{R_o W_o}$$

where $L_1$ is the length of the oriented film or sheet and $W_1$ is the width of the oriented film or sheet. $L_o$ and are $W_o$ are the length and width of the film prior to the orientation. The total areal ratio for a film or sheet should be in the same range as for a container.

The rate of orientation ratio should exceed about 2 $sec^{-1}$, preferably up to 3 $sec^{-1}$ although higher ratios are possible. The temperature at which orientation occurs is slightly above the glass transition temperature of the polyester. It is possible to orient at higher preform temperatures but blow molding the subject bottle at such process conditions risks reducing the capacity of the system for absorbing oxygen and reducing overall barrier performance.

It has been found that the necessary orientation may be preferably obtained by the reheat stretch blow molding process which consists of injection molding or otherwise forming a preform of weight equal to the weight of the finished bottle, cooling the preform to a solid state and subsequently reheating the preform to a temperature at or slightly above the glass transition temperature of polyester, trapping the heated preform in a blow mold, stretching the preform axially with a stretch rod and blowing the bottle to the shape of the blow mold. Also preferable for achieving this orientation is the Husky 1½ step process for blow molding which may be describe as injection molding a preform, and within a short time, but not exceeding 30 seconds, allowing the preform to cool more than can be expected by the injection stretch blow molding process conditioning step. The preform is reheated in an oven similar to the oven for the reheat stretch blow molding process and then blow molded by the stretch blow molding process substantially below the forming temperature.

The use of the injection blow molding or the injection stretch blow molding process is not as useful in the present application. In this process the material is injection molded to form a preform. The molded preform while still at the forming temperature in the center is indexed on a turret device and moved to an equilibation station to rewarm the chilled surface and then indexed for up to 30 seconds and then indexed into the blow mold where the stretch rod and blow air are activated essentially the same as any other stretch blow molding process.

It has been found that the oxygen barrier property of the structures made from the composition of the present invention are substantially greater than ordinary PET when biaxially oriented by the reheat stretch blow process or other method of imparting a high orientation.

If the blend composition is biaxially oriented by reheat stretch blow molding process, it has been found that there is more than a 1000 fold improvement in oxygen barrier properties which can be achieved using the blends of the present invention compared to the regular blow molded PET. (See data for high orient bottle in Table 5.)

EXAMPLE 1

(Two Liter Bottle)

As an example of this invention, a blend comprising 7.5% nylon MXD6 such as 6001 from Mitsubishi Gas Chemicals was prepared with PET such as Eastman 9663, injection molded into a preform and reheat blow molded into bottles after reheating according to standard practice for this type of material. The blow ratios of the bottles were 2.25 on the axial dimension and 3.6 in the radial dimension. The 52 gm 2-liter bottles so prepared had oxygen permeation values of 0.0016 cc $O_2$/day atm. By way of comparison, bottles of conventional 10% nylon MXD6/90% PET made via injection stretch blow molding (ISBM) process have permeation values typically of about 0.02 cc $O_2$/day atm and multi-layer structures comprising 10% dry EVOH, known to be a superior barrier to nylon MXD6, have permeation values typically about 0.01 cc $O_2$/day atm. The performance of the modified polyester/modified nylon blend described herein is significantly improved over what would be normally expected by those skilled in the art by a factor of at least five and perhaps up to tenfold.

EXAMPLE 2

32 Oz. Wide Mouth Jar

Table 1 below shows that the oriented blend of the present invention generates a higher barrier than either an unoriented blend of the same composition or a multilayer structure with discrete layers.

TABLE 1

OXYGEN PERMEATION RATE OF BLEND vs MULTILAYER
(CC MIL/100 $IN^2$ DAY ATM)

| COMPOSITION PET/NYLON-MXD6 | OXYGEN PERMEATION | | |
|---|---|---|---|
| | UNORIENTED BLEND (CALCULATED) | ORIENTED BLEND (EXPERIMENTAL) | DISCRETE+ LAYERS (CALCULATED) |
| 100/0 | 4.50 | 4.50 | 4.50 |
| 95/5 | 4.26 | 1.64 | 2.20 |
| 92.5/7.5 | 4.13 | 1.37 | 1.76 |
| 90/10 | 4.01 | 0.86 | 1.46 |
| 85/15 | 3.78 | 0.50 | 1.10 |
| 70/30 | 3.08 | 0.45 | 0.64 |

+P = 0.23 CC MIL/100 $IN^2$ DAY ATM IS USED FOR NYLON MXD6 IN CALCULATIONS (BASED ON DATA FROM BIAXIALLY ORIENTED FILM AT ROOM TEMPERATURE AND 87.5% RH)

Table 2 shows that the oriented blend generates higher barrier than unoriented blend by either of two methods of testing, the cumulative method and the steady state method.

TABLE 2

OXYGEN PERMEATION RATE OF PET/NYLON-MXD6 BLENDS (32 OUNCE JAR)

| PET/Nylon-MXD6 Blend Ratio (wt) | OXYGEN PERMEATION (cc/jar day air) | |
|---|---|---|
| | Cumulative+ Method | Steady-State Method |
| 100/0 | 0.033 | 0.041 |
| 95/5 | 0.012 | 0.022 |
| 92.5/7.5 | 0.010 | 0.003 |
| 90/10 | 0.006 | — |
| 85/15 | 0.004 | 0.002 |
| 70/30 | 0.003 | 0.002 |

+14 Days average at 70 F., 100% RH inside; 75% RH outside

Table 3 depicts the $O_2$ permeability of an unoriented blend of nylon MXD6 in PET.

TABLE 3

$O_2$ Permeability of Unoriented Blend

| | 2. Nylon MXD6 in PET blend | | | |
|---|---|---|---|---|
| | 0 | 7.5 | 10 | 15 |
| P*(Unoriented) | 0.098 | 0.047 | 0.052 | 0.049 |

*27 day storage 100% RH inside 75% RH outside 100% $O_2$ outside

Table 4 is an accelerated long term permeability test showing the striking oxygen absorption power in addition to the oxygen barrier property in a 100% $O_2$ atmosphere.

TABLE 4

AVERAGE $O_2$ PERMEABILITY OF ORIENTED PET/MXD6 BLENDS* P = CC/100 $IN^2$ DAY ATM

| STORAGE DAYS | NYLON-MXD6 CONCENTRATION | | | | | |
|---|---|---|---|---|---|---|
| | 0% | 5% | 7.5% | 10% | 15% | 30% |
| 7 | 0.203 | 0.060 | 0.052 | 0.045 | 0.023 | 0.018 |
| 14 | 0.204 | 0.075 | 0.062 | 0.039 | 0.023 | 0.021 |
| 55 | 0.197 | 0.115 | 0.106 | 0.075 | 0.057 | 0.029 |
| 349 | 0.186 | 0.135 | 0.128 | 0.094 | 0.082 | — |
| 688 | 0.181 | 0.140 | 0.135 | 0.096 | 0.092 | 0.081 |

*32 OZ WIDEMOUTH JAR, VOL - 980 CC. AREA = 77.8 $IN^2$
*TESTING CONDITION: 7° F./100% RH INSIDE /75% RH OUTSIDE 100% $O_2$OUTSIDE

FIG. 2 is a graph showing the long term permeation curves of an oriented PET/nylon MXD6 blend under 100% $O^2$ atmosphere and high relative humidity at various levels of nylon MXD6. The graph shows time dependent permeation rates of the container for various levels of nylon/MXD6 in the polyester. The oxygen absorbing ability lasts for over a two year period of time in a pure $O_2$ environment. In a normal air atmosphere, this effect may be stretched over many years.

| Percent | Legend |
|---------|--------|
| 0% | |
| 5% | |
| 7.5% | Δ |
| 10% | |
| 15% | □ |
| 30% | |

The x in FIG. 2 equals 40-60 days from the date the containers were made.

EXAMPLE 3

For PET/nylon MXD6 blends containing a transition metal catalyst such as cobalt the oxygen absorption rate is accelerated.

The measurable permeation rate reaches its minimum in 2-3 weeks under ambient conditions. A 50% RH environment at room temperature provides the best conditions for these bottles to reach the minimum permeation rate expetitiously. The presence of the catalyst, such as cobalt, accelerates the aging process thereby producing a minimum permeation rate in a shorter period of time, such as 1 week or less.

Figure 3:
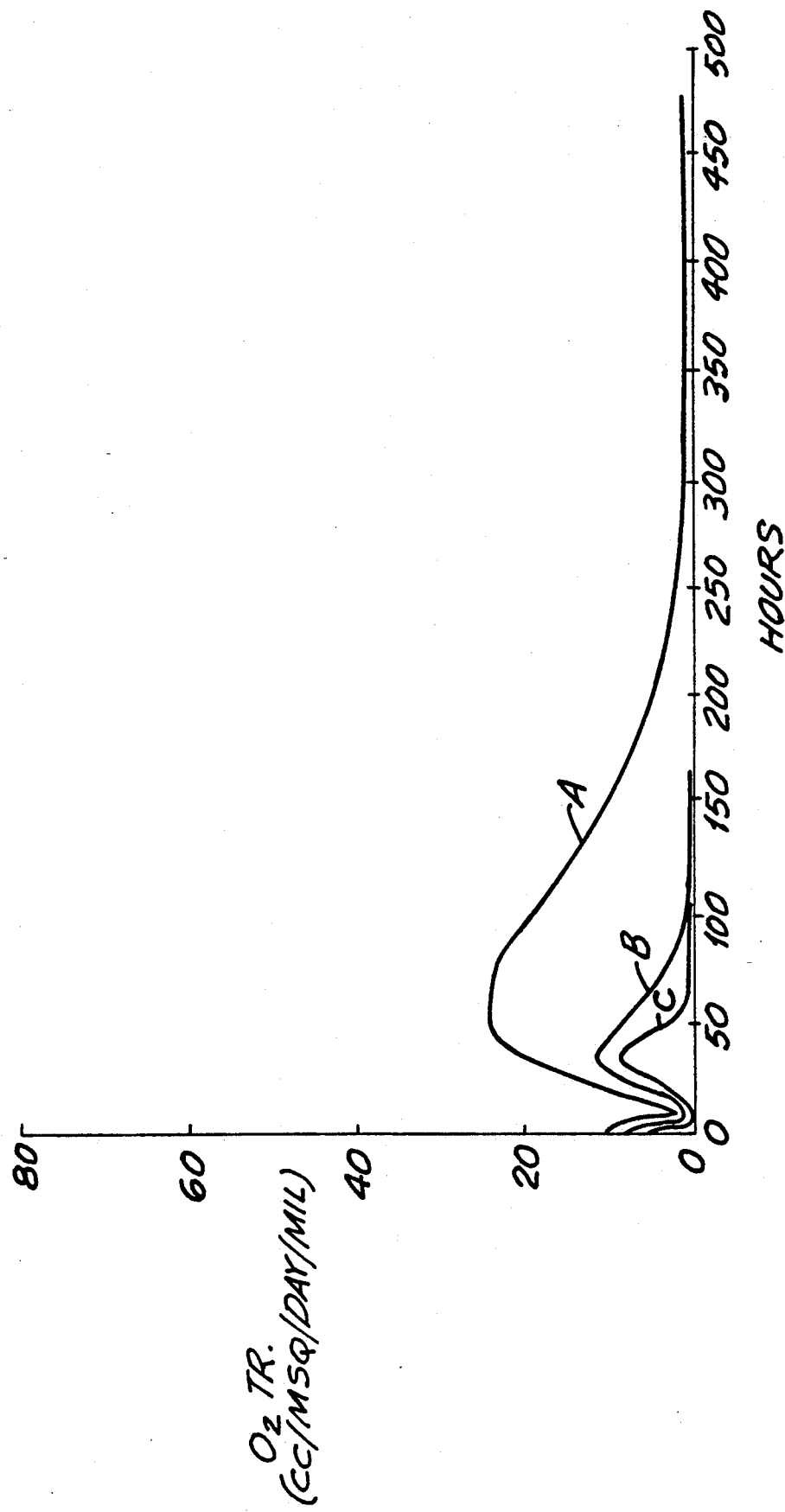
FIG. 3 is a graph showing the decrease in aging time required for the barrier where a catalyst is present.

FIG. 3 shows a graph depicting the acceleration of the aging process where cobalt is present. Curve A depicts the aging process for a PET/nylon MXD6 composition having 6% nylon MXD6 and with only nascent cobalt in the composition and without any added cobalt present. Curve B is a composition where there is 6% nylon MXD6 and there is 50 ppm added cobalt. Curve C is a composition wherein there is 6% nylon MXD6 and there is there is 100 ppm added cobalt present. The hours are the number of hours on the Oxtran testing equipment. The bottles that were tested were not aged prior to testing. As can be seen cobalt decreases the amount of time necessary for the aging process to be complete. The permeation rate for a fully aged specimen is shown in Table 5.

TABLE 5

| | Fully Aged Specimen Before Testing Permeation Values (cc mils/m² day) | | |
|---|---|---|---|
| | V. Low Orient Cast Film | Low Orient Bottle (not fully aged) (5.4 areal ratio) | High Orient Bottle (8.1 areal ratio) |
| PET Control | 170 (<24 hrs.) (2.5 mil) | 141 (90 hrs.) (16 mils) | 75 (<120 hrs.) (14 mils) |
| 7.5% MXD6 nascent Cobalt only | 90 (72 hrs.) (10 mils) | 98 (90 hrs.) (14 mils) | 0.000 (48 hrs.) (14 mils) |
| 7.5% MXD6 100 ppm Cobalt added | — | 28 (26 hrs.) (18 mils) | 0.000 (36 hrs.) (13 mils) |
| 7.5% MXD6 nascent Cobalt only | 0.3 (290 hrs.) (30 mils) | | |

We claim:

1. An improved oxygen barrier and oxygen absorbing composition comprising from 70% to 85% of an aromatic condensation polymer having blended therein from 30% to 15% of an oxygen barrier material and having from 49 ppm up to 250 ppm of a transition metal catalyst.

2. A composition according to claim 1 wherein the transition metal catalyst is cobalt.

3. A composition according to claim 1 wherein the transition metal catalyst is cobalt and is present in an amount of from 49 ppm up to 250 ppm.

4. A composition according to claim 1 wherein the aromatic condensation polymer is selected from the group consisting of a formable polyester and a formable polycarbonate.

5. A composition according to claim 4 wherein the polyester is PET.

6. A composition according to claim 4 wherein the aromatic condensation polymer is a polyester and wherein the oxygen barrier material is a xylylene group-containing polyamide.

7. A composition according to claim 1 wherein the oxygen barrier material is selected from the group consisting of aliphatic nylon, aromatic nylon, oriented amorphous nylon and oriented amorphous EVOH.

8. A composition according to claim 7 wherein the aromatic nylon is a xylylene group containing polyamide.

9. An improved oxygen barrier and oxygen absorbing composition comprising from 70% to 85% of a polyester or polycarbonate with from 30% to 15% xylylene group containing polyamide and from 49 ppm up to 250 ppm of a transition metal catalyst.

10. A composition according to claim 9 wherein the catalyst is cobalt.

11. A composition according to claim 10 where the cobalt is present in the range of 49 ppm to about 110 ppm.

12. An improved oxygen barrier and oxygen absorbing composition comprising from 70% to 85% polyester and from 30% to 15% xylene group-containing polyamide and from 49 ppm up to 250 ppm of a transition metal catalyst.

13. A composition according to claim 12 wherein the catalyst is cobalt.

14. A composition according to claim 12 wherein the cobalt is present in the range of 49 ppm to about 110 ppm.

15. A composition according to claim 14 the cobolt is present in an amount of about 62 ppm.

16. A composition according to claim 12 wherein the polyester is 85% and the polyamide is 15%.

17. A composition according to claim 16 wherein the catalyst is cobalt.

18. A composition according to claim 17 wherein the cobalt is present in the range of 49 ppm to about 110 ppm.

19. A composition according to claim 18 wherein the cobalt is present in an amount of about 62 ppm.

20. A composition according to claim 19 wherein the cobalt is present in an amount of about 62 ppm.

21. A composition according to claim 12 wherein the polyester is 70% and the polyamide is 30%.

22. A composition according to claim 21 wherein the catalyst is cobalt.

23. A composition according to claim 22 wherein the cobalt is present in the range of 49 ppm to about 110 pp.

24. A composition according to claim 23 wherein the cobalt is preset in an amount of about 62 ppm.

* * * * *

UNITED STATES PATENT AND TRADEMARK OFFICE
CERTIFICATE OF CORRECTION

PATENT NO. : 5,281,360
DATED : January 25, 1994
INVENTOR(S) : KUO-ZONG HONG, YONG J. KIM AND STEPHAN W. CORNELL It is certified that error appears in the above-indentified patent and that said Letters Patent is hereby corrected as shown below:

Column 2, lines 32, 36, 38, 44; column 3, lines 39, 43, 57 and 60; column 5, lines 15, 53 and 55;

and Column 10 lines 16, 23 and 27, for the chemical constituent "xylylene" (each occurrence)

should read --xylene--.

Column 6, line 28, delete "are"; line 53 "describe" should read --described--.

Column 9, line 22, "expetitiosly" should read --expeditiously.

Signed and Sealed this

Seventeenth Day of January, 1995

Attest:

BRUCE LEHMAN

*Attesting Officer*         *Commissioner of Patents and Trademarks*